(12) United States Patent
Kakei et al.

(10) Patent No.: US 7,929,272 B2
(45) Date of Patent: Apr. 19, 2011

(54) THIN FILM CAPACITOR

(75) Inventors: Shinichiro Kakei, Tokyo (JP); Hitoshi Saita, Tokyo (JP); Kuniji Koike, Tokyo (JP); Kenji Horino, Tokyo (JP)

(73) Assignee: TDK Corporation, Tokyo (JP)

( * ) Notice: Subject to any disclaimer, the term of this patent is extended or adjusted under 35 U.S.C. 154(b) by 120 days.

(21) Appl. No.: 11/806,824

(22) Filed: Jun. 4, 2007

(65) Prior Publication Data

US 2007/0278627 A1 Dec. 6, 2007

(30) Foreign Application Priority Data

Jun. 6, 2006 (JP) ................. P2006-157572

(51) Int. Cl.
*H01G 4/06* (2006.01)
(52) U.S. Cl. ................ 361/321.1; 361/311
(58) Field of Classification Search ............ 361/311, 361/321.1
See application file for complete search history.

(56) References Cited

U.S. PATENT DOCUMENTS

| 6,172,385 B1* | 1/2001 | Duncombe et al. | 257/295 |
| 6,207,525 B1* | 3/2001 | Tu | 438/396 |
| 6,274,224 B1* | 8/2001 | O'Bryan et al. | 428/209 |
| 6,333,202 B1* | 12/2001 | Adkisson et al. | 438/3 |
| 6,565,774 B2* | 5/2003 | Ohashi et al. | 252/514 |
| 7,307,270 B2* | 12/2007 | Aratani et al. | 257/2 |
| 7,439,111 B2* | 10/2008 | Ohtani et al. | 438/151 |
| 2001/0013388 A1 | 8/2001 | Miyazaki et al. | |
| 2001/0038906 A1 | 11/2001 | O'Bryan et al. | |
| 2003/0072129 A1* | 4/2003 | Kuwako et al. | 361/525 |
| 2004/0175585 A1* | 9/2004 | Zou et al. | 428/469 |
| 2005/0146838 A1* | 7/2005 | Shioga et al. | 361/306.3 |
| 2005/0230731 A1* | 10/2005 | Sawasaki et al. | 257/296 |
| 2006/0079050 A1* | 4/2006 | Cahalen et al. | 438/250 |

FOREIGN PATENT DOCUMENTS

| JP | A-05-251258 | 9/1993 |
| JP | A-08-078283 | 3/1996 |
| JP | A-2001-217135 | 8/2001 |
| JP | A-2002-260953 | 9/2002 |
| JP | A-2002-536825 | 10/2002 |
| JP | A-2003-234242 | 8/2003 |
| JP | A-2004-319561 | 11/2004 |

* cited by examiner

*Primary Examiner* — Eric Thomas
*Assistant Examiner* — David M Sinclair
(74) *Attorney, Agent, or Firm* — Oliff & Berridge, PLC (57) ABSTRACT

A dielectric device having a dielectric layer and first to nth metal layers (where n is an integer of 2 or greater) in contact with the dielectric layer. At least one of the first to nth metal layers contains a base metal. Interfaces between the first to nth metal layers and the dielectric layer have respective arithmetic mean roughnesses of $Ra_1$ to $Ra_n$ (nm), while an average value Ram (nm) of the arithmetic mean roughnesses of $Ra_1$ to $Ra_n$ (nm) and a thickness T (nm) of the dielectric layer satisfy T/Ram ≧1.3.

8 Claims, 6 Drawing Sheets

THIN FILM CAPACITOR

BACKGROUND OF THE INVENTION

1. Field of the Invention

The present invention relates to a dielectric device.

2. Related Background Art

Dielectric devices having a structure in which an electrode is provided on a dielectric layer have been known. A typical example of the dielectric devices is a capacitor. Japanese Patent Application Laid-Open No. HEI 2004-319561 discloses a method of manufacturing a capacitor by using a metal foil having a surface formed with a dielectric layer. Japanese Patent Application Laid-Open No. HEI 5-251258 discloses a thin-film capacitor in which a lower electrode, a dielectric layer, and an upper electrode are successively laminated on a substrate.

SUMMARY OF THE INVENTION

Recently, along with demands for smaller sizes and higher quality in dielectric devices, it has been desired to thin the dielectric layer. When the dielectric layer is made too thin, however, the leakage current between the electrodes increases greatly.

It is therefore an object of the present invention to provide a dielectric device which can sufficiently suppress the leakage current even when the dielectric layer is thin.

The dielectric device in accordance with the present invention comprises a dielectric layer and first to nth metal layers (where n is an integer of 2 or greater) in contact with the dielectric layer. Interfaces between the first to nth metal layers and the dielectric layer have respective arithmetic mean roughnesses of $Ra_1$ to $Ra_n$ (nm). An average value Ram (nm) of these arithmetic mean roughnesses of $Ra_1$ to $Ra_n$ (nm) and a thickness T (nm) of the dielectric layer satisfy $T/Ram \geq 1.3$.

Even when the dielectric layer is thin, the leakage current in the dielectric device can sufficiently be suppressed if the roughness in the interface between each metal layer and the dielectric layer is set appropriately such that $T/Ram \geq 1.3$ is satisfied.

More preferably, $T/Ram \geq 3.6$. This reduces the leakage current of the dielectric device more than in the case where T/Ram is less than 3.6.

Further preferably, $T/Ram \geq 12$. This reduces the leakage current of the dielectric device more than in the case where T/Ram is less than 12.

Further preferably, $T/Ram \geq 28$. This reduces the leakage current of the dielectric device more than in the case where T/Ram is less than 28.

At least one of the first to nth metal layers may contain a base metal. Examples of the base metal include Ni, Cu, and Al. For precision polishing of a metal surface, a technique using chemical etching together with mechanical polishing (e.g., chemical mechanical polishing) is often used. When a metal layer is or contains a base metal, the chemical etching progresses faster, whereby the above-mentioned surface roughness can be obtained easily. Preferably, in the metal layer containing a base metal, the base metal content is 40 mass % or greater. One of the first to nth metal layers may be a metal foil supporting the dielectric layer. The dielectric layer may be constituted by an oxide containing at least one element of Ba, Sr, Ca, Pb, Ti, Zr, and Hf. The dielectric layer may be constituted by an oxide having a perovskite structure.

DESCRIPTION OF THE PREFERRED EMBODIMENTS

In the following, embodiments of the present invention will be explained in detail with reference to the accompanying drawings. In the explanation of the drawings, the same constituents will be referred to with the same numerals while omitting their overlapping descriptions.

First, the basic principle of the present invention will be explained. Concerning a dielectric device in which multiple metal layers are in contact with a dielectric layer, the inventors take account of not only the thickness of the dielectric layer but also the roughness between the dielectric layer and each metal layer as a parameter which affects the leakage current.

As the dielectric layer is thinner, a greater leakage current tends to flow therethrough when a voltage is applied between metal layers. This tendency occurs not only when a pair of metal layers is formed so as to hold the dielectric layer therebetween, but also when multiple metal layers are formed on one main face of the dielectric layer.

On the other hand, according to studies by the inventors, the leakage current flowing between metal layers tends to decrease as the roughness between the dielectric layer and each metal layer is smaller. In the dielectric device, there are interfaces of the same number as that of metal layers, and their respective roughnesses affect the leakage current. Therefore, the inventors comprehensively evaluate the respective roughnesses of the interfaces between the dielectric layer and multiple metal layers by using their average value.

Letting $Ra_1$ to $Ra_n$ (nm) be the respective roughnesses of the first to nth metal layers (where n is an integer of 2 or greater), their average value Ram (nm) is represented by $(Ra_1 + Ra_2 + \ldots + Ra_n)/n$. As the average value of roughness Ram is smaller, the leakage current between the metal layers decreases. Therefore, even when the dielectric layer is thin, the leakage current can sufficiently be suppressed if the average value of roughness is small.

Thus, the leakage current is suppressed more as the thickness of the dielectric layer is greater and as the average value of interface roughness is smaller. This means that the leakage current is suppressed more as the ratio T/Ram of the thickness T (nm) of the dielectric layer to the average value Ram of interface roughness is greater. Therefore, even when the dielectric layer is thin (T is small), a dielectric device having sufficiently suppressed leakage current can be obtained if Ram is appropriately set such that T/Ram is large enough.

Figure 1:
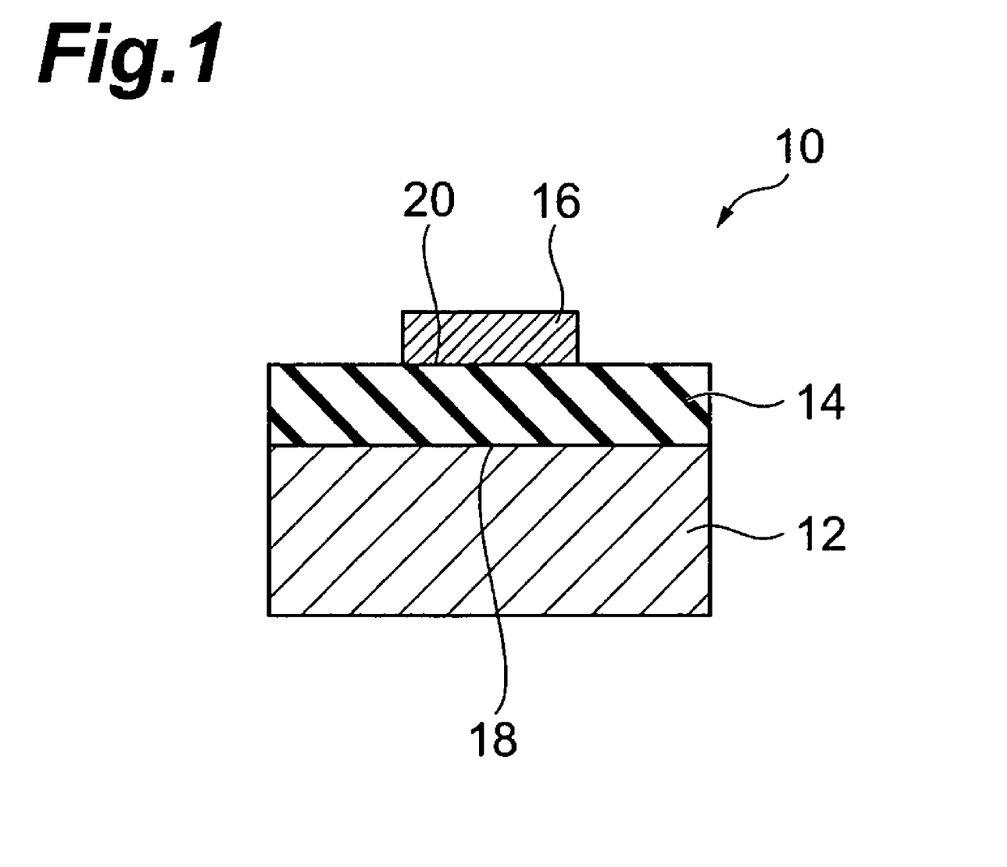
FIG. 1 is a schematic sectional view showing the structure of the dielectric device in accordance with an embodiment.

With reference to specific examples, values of T/Ram appropriate for suppressing the leakage current will be explained below. FIG. 1 is a schematic sectional view showing the structure of the dielectric device 10 in accordance with an embodiment. The dielectric device 10 has a metal foil 12 acting as a lower metal layer, a dielectric layer 14 provided on the upper face of the metal foil 12, and an upper metal layer 16 provided on the upper face of the dielectric layer 14. Namely, the metal foil 12 is in contact with one main face (lower face) of the dielectric layer 14, while the upper metal layer 16 is in contact with the other main face (upper face) of the dielectric layer 14. In FIG. 1, 18 refers to the interface between the metal foil 12 and dielectric layer 14, while 20 refers to the interface between the dielectric layer 14 and upper metal layer 16. This dielectric device 10 is a thin-film capacitor using the metal foil 12 and upper metal layer 16 as a pair of counter electrodes.

The metal foil 12 is self-sustainable, and thus functions as a base for supporting the dielectric layer 14 and upper metal layer 16. Preferred materials for the metal foil 12 and upper metal layer 16 are base metals which are inexpensive and low in resistance, such as Cu, Ni, and Al, for example.

Figure 2:
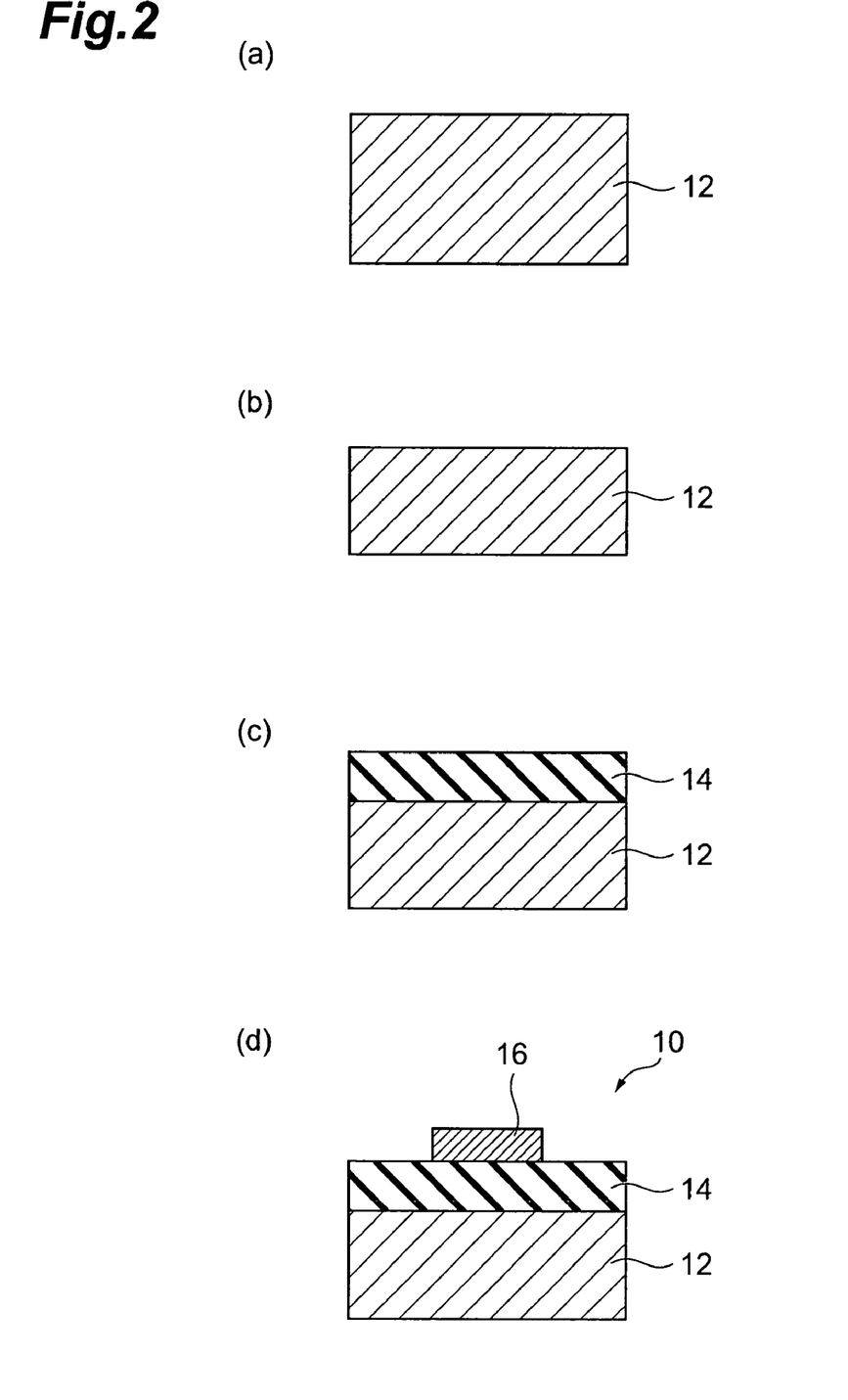
FIG. 2 is a process chart showing a method of manufacturing the dielectric device.

A method of manufacturing the dielectric device 10 will be explained below. FIG. 2 is a process chart showing this manufacturing method. First, the metal foil 12 is prepared (FIG. 2(a)), and one main face (upper face) thereof is polished to obtain a mirror surface (FIG. 2(b)). Examples of the polishing method include not only chemical mechanical polishing (CMP), but also buffing, lapping, brushing, and electrochemical polishing.

Next, the dielectric layer 14 is formed on the polished upper face of the metal foil 12 (FIG. 2(c)). Examples of the method for forming the dielectric layer 14 include chemical solution deposition and sputtering. Specifically, a dielectric material is attached to the upper face of the metal foil 12 and fired, so as to form the dielectric layer 14.

Subsequently, the upper metal layer 16 is formed on the upper face of the dielectric layer 14 by sputtering or the like (FIG. 2(d)). Thus, the dielectric device 10 is obtained.

As mentioned above, even when the dielectric layer 14 is thin, the leakage current can sufficiently be suppressed if the roughness is small at the interface 18 between the lower metal layer 12 and dielectric layer 14 and the interface 20 between the dielectric layer 14 and upper metal layer 16. The roughness of these interfaces can comprehensively be evaluated by using the average value Ram [=(Ra$_1$+Ra$_2$)/2] of the arithmetic mean roughness Ra$_1$ of the interface 18 and the arithmetic mean roughness Ra$_2$ of the interface 20. The leakage current between the metal foil 12 and upper metal layer 16 can be suppressed more as the ratio (T/Ram) of the thickness T (nm) of the dielectric layer 14 to the average value Ram of interface roughness is greater.

The arithmetic mean roughness is defined in JIS B 0601, according to which the arithmetic mean roughnesses of the interfaces 18, 20 are determined. A method of determining the arithmetic mean roughnesses of the interfaces will now be explained.

First, for determining the arithmetic mean roughnesses of the interfaces 18, 20, a cross section of the dielectric device 10 is exposed. This can be done by a method of mechanically polishing the dielectric device 10 embedded in a resin, focused ion beam method, or the like.

Figure 3:
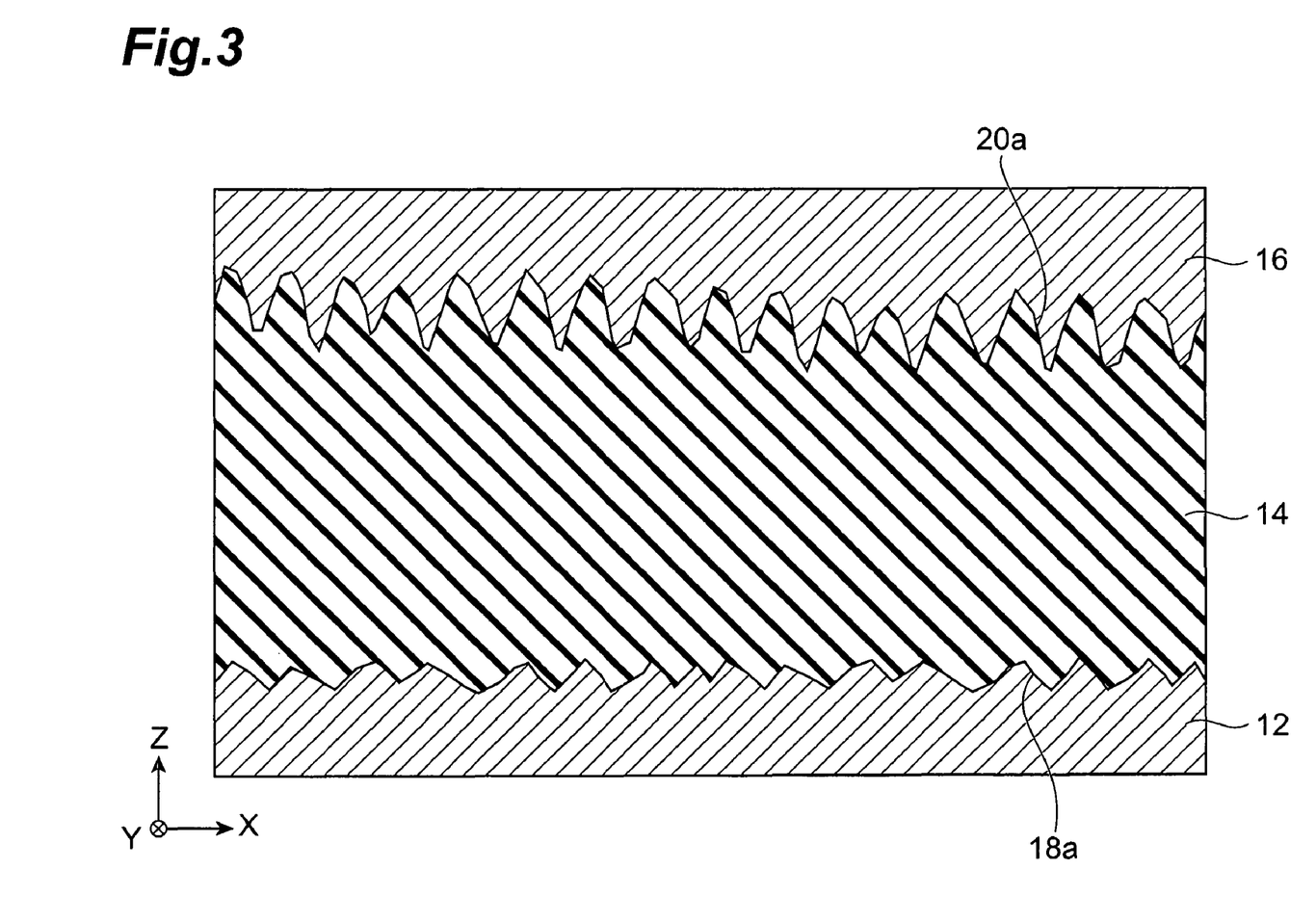
FIG. 3 is a schematic view showing a cross-sectional image of the dielectric device.

Next, a part including cross-sectional curves of the interfaces 18 and 20 in the exposed cross section is observed with a scanning electron microscope or the like, so as to acquire an image of this part. FIG. 3 is a schematic view showing thus acquired cross-sectional image. In FIG. 3, 18a and 20a refer to the cross-sectional curves of the interfaces 18 and 20, respectively. The length in the horizontal direction (X direction of FIG. 3) of this cross-sectional image is set to a reference length defined in 7.2.1. of JIS B 0633 or greater. When different reference lengths are determined at the interfaces 18 and 20, the horizontal length of the cross-sectional image is set to the longer reference lengths or greater.

Figure 4:
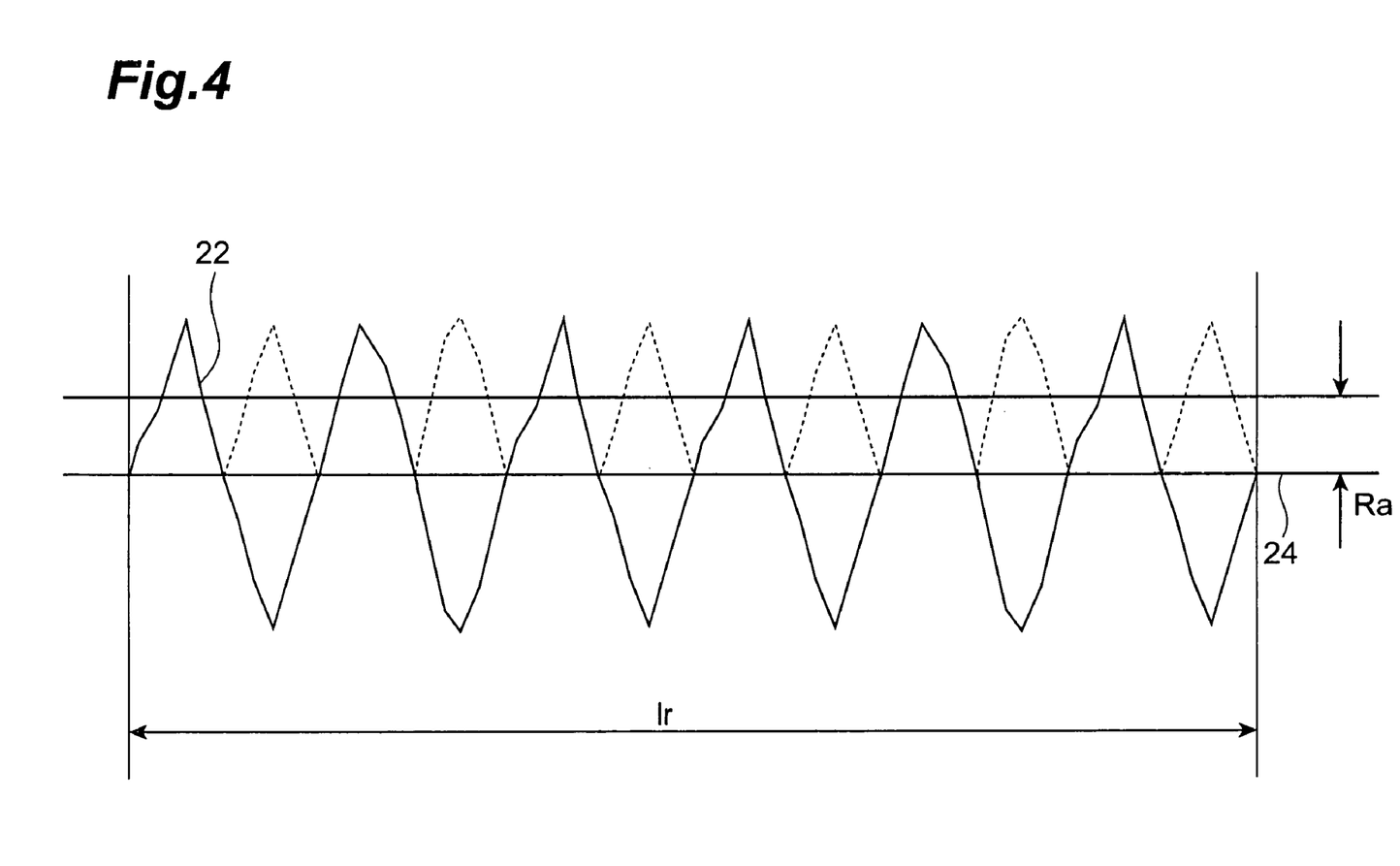
FIG. 4 is a chart showing an example of roughness curve.

Next, information of undulations (ups and downs) in the cross-sectional curves 18a and 20a of the interfaces is acquired from the cross-sectional image. Specifically, as defined in 3.1.6 of JIS B 0601, a high-pass filter is used so as to cut off longer wavelength components from the cross-sectional curves 18a and 20a, and obtain roughness curves. FIG. 4 is a chart showing an example of roughness curve. In FIG. 4, 22 refers to a roughness curve, whereas 24 indicates an average line of the roughness curve 22.

Thereafter, an arithmetic operation represented by the following expression is performed according to each of the respective roughness curves corresponding to the interfaces 18 and 20, whereby the arithmetic mean roughnesses of the interfaces are determined.

$$Ra = \frac{1}{lr} \int_0^{lr} |Z(x)| dx \tag{1}$$

This expression is defined in 4.2.1 of JIS B 0601. Here, Ra is the arithmetic mean roughness, and lr is the reference length. Z(x) is the vertical coordinate value defined in 3.2.8 of JIS B 0601 and represents the height of the roughness curve at a given horizontal position x. The sign of Z(x) is negative and positive on the lower and upper sides of the average line, respectively.

The inventors made a number of dielectric devices 10 under various conditions according to the above-mentioned manufacturing method, determined the ratio T/Ram of the thickness T of the dielectric layer 14 to the average value Ram of interface roughness in each of thus obtained devices, and investigated numerical ranges of T/Ram appropriate for suppressing the leakage current.

The following Table 1 shows the manufacturing conditions.

TABLE 1

| STEP | PARAMETER | 1-1 | 1-2 | 1-3 | 2-1 | 2-2 | 2-3 | 3-1 | 3-2 | 3-3 |
|---|---|---|---|---|---|---|---|---|---|---|
| POLISH-ING | WORK MATERIAL/SIZE | PURE Ni 50 × 50(mm) | SAME AS LEFT | SAME AS LEFT | SAME AS LEFT | SAME AS LEFT | SAME AS LEFT | SAME AS LEFT | SAME AS LEFT | SAME AS LEFT |
| | APPARATUS | NO POLISHING | NO POLISHING | NO POLISHING | SINGLE-SIDE POLISHER | SAME AS LEFT | SAME AS LEFT | SAME AS LEFT | SAME AS LEFT | SAME AS LEFT |
| | ABRASIVE | | | | ALUMINA ABRASIVE GRAIN Φ1 μm, ACIDIC SOLVENT (pH = 3) | SAME AS LEFT | SAME AS LEFT | SAME AS LEFT | SAME AS LEFT | SAME AS LEFT |
| | PLATE MATERIAL | | | | RESIN PAD | SAME AS LEFT | SAME AS LEFT | SAME AS LEFT | SAME AS LEFT | SAME AS LEFT |
| | ROTATING SPEED | | | | 60 rpm | SAME AS LEFT | SAME AS LEFT | SAME AS LEFT | SAME AS LEFT | SAME AS LEFT |
| | PROCESSING | | | | 1 min | SAME | SAME | 6 min | SAME | SAME |

TABLE 1-continued

| | | | 1-1 | 1-2 | 1-3 | 2-1 | 2-2 | 2-3 | 3-1 | 3-2 | 3-3 |
|---|---|---|---|---|---|---|---|---|---|---|---|
| | TIME LOAD | | 250 g/cm² | SAME AS LEFT | SAME AS LEFT | SAME AS LEFT | SAME AS LEFT | SAME AS LEFT | SAME AS LEFT | SAME AS LEFT | SAME AS LEFT |
| DIELECTRIC FORMATION | DIELECTRIC MATERIAL | BST | SAME AS LEFT | SAME AS LEFT | SAME AS LEFT | SAME AS LEFT | SAME AS LEFT | SAME AS LEFT | SAME AS LEFT | SAME AS LEFT | SAME AS LEFT |
| | COATING METHOD | SPIN COAT | SAME AS LEFT | SAME AS LEFT | SAME AS LEFT | SAME AS LEFT | SAME AS LEFT | SAME AS LEFT | SAME AS LEFT | SAME AS LEFT | SAME AS LEFT |
| | DIELECTRIC THICKNESS | 100 nm | 200 nm | 700 nm | 100 nm | 200 nm | 700 nm | 100 nm | 200 nm | 700 nm | | |
| | FIRING TEMP. | 800° C. | SAME AS LEFT | SAME AS LEFT | SAME AS LEFT | SAME AS LEFT | SAME AS LEFT | SAME AS LEFT | SAME AS LEFT | SAME AS LEFT | SAME AS LEFT |
| UPPER ELECTRODE FORMATION | ELECTRODE MATERIAL | Cu | SAME AS LEFT | SAME AS LEFT | SAME AS LEFT | SAME AS LEFT | SAME AS LEFT | SAME AS LEFT | SAME AS LEFT | SAME AS LEFT | SAME AS LEFT |
| | ELECTRODE THICKNESS/ FORM | 200(nm)/ 4.0 × 4.0 (mm) | SAME AS LEFT | SAME AS LEFT | SAME AS LEFT | SAME AS LEFT | SAME AS LEFT | SAME AS LEFT | SAME AS LEFT | SAME AS LEFT | SAME AS LEFT |

| STEP | PARAMETER | 4-1 | 4-2 | 4-3 | 5-1 | 5-2 | 5-3 | 6-1 | 6-2 | 6-3 |
|---|---|---|---|---|---|---|---|---|---|---|
| POLISHING | WORK MATERIAL/ SIZE | SAME AS LEFT | SAME AS LEFT | SAME AS LEFT | SAME AS LEFT | SAME AS LEFT | SAME AS LEFT | SAME AS LEFT | SAME AS LEFT | SAME AS LEFT |
| | APPARATUS | SAME AS LEFT | SAME AS LEFT | SAME AS LEFT | SAME AS LEFT | SAME AS LEFT | SAME AS LEFT | SAME AS LEFT | SAME AS LEFT | SAME AS LEFT |
| | ABRASIVE | SAME AS LEFT | SAME AS LEFT | SAME AS LEFT | SAME AS LEFT | SAME AS LEFT | SAME AS LEFT | SAME AS LEFT | SAME AS LEFT | SAME AS LEFT |
| | PLATE MATERIAL | SAME AS LEFT | SAME AS LEFT | SAME AS LEFT | SAME AS LEFT | SAME AS LEFT | SAME AS LEFT | SAME AS LEFT | SAME AS LEFT | SAME AS LEFT |
| | ROTATING SPEED | SAME AS LEFT | SAME AS LEFT | SAME AS LEFT | SAME AS LEFT | SAME AS LEFT | SAME AS LEFT | SAME AS LEFT | SAME AS LEFT | SAME AS LEFT |
| | PROCESSING TIME | 9 min | SAME AS LEFT | SAME AS LEFT | 95 min | SAME AS LEFT | SAME AS LEFT | 140 min | SAME AS LEFT | SAME AS LEFT |
| | LOAD | SAME AS LEFT | SAME AS LEFT | SAME AS LEFT | SAME AS LEFT | SAME AS LEFT | SAME AS LEFT | SAME AS LEFT | SAME AS LEFT | SAME AS LEFT |
| DIELECTRIC FORMATION | DIELECTRIC MATERIAL | SAME AS LEFT | SAME AS LEFT | SAME AS LEFT | SAME AS LEFT | SAME AS LEFT | SAME AS LEFT | SAME AS LEFT | SAME AS LEFT | SAME AS LEFT |
| | COATING METHOD | SAME AS LEFT | SAME AS LEFT | SAME AS LEFT | SAME AS LEFT | SAME AS LEFT | SAME AS LEFT | SAME AS LEFT | SAME AS LEFT | SAME AS LEFT |
| | DIELECTRIC THICKNESS | 100 nm | 200 nm | 700 nm | 100 nm | 200 nm | 700 nm | 100 nm | 200 nm | 700 nm |
| | FIRING TEMP. | SAME AS LEFT | SAME AS LEFT | SAME AS LEFT | SAME AS LEFT | SAME AS LEFT | SAME AS LEFT | SAME AS LEFT | SAME AS LEFT | SAME AS LEFT |
| UPPER ELECTRODE FORMATION | ELECTRODE MATERIAL | SAME AS LEFT | SAME AS LEFT | SAME AS LEFT | SAME AS LEFT | SAME AS LEFT | SAME AS LEFT | SAME AS LEFT | SAME AS LEFT | SAME AS LEFT |
| | ELECTRODE THICKNESS/ FORM | SAME AS LEFT | SAME AS LEFT | SAME AS LEFT | SAME AS LEFT | SAME AS LEFT | SAME AS LEFT | SAME AS LEFT | SAME AS LEFT | SAME AS LEFT |

In this table, the items of "Polishing" indicate polishing conditions of the metal foil 12. The metal foil 12 was constituted by pure Ni, whose upper side was polished by chemical mechanical polishing (CMP) using a single-side polishing machine. However, no CMP was performed in manufacturing conditions 1-1, 1-2, and 1-3. In the other manufacturing conditions, CMP was performed by the times listed in Table 1. Namely, the CMP time was 1 minute in manufacturing conditions 2-1, 2-2, and 2-3; 6 minutes in manufacturing conditions 3-1, 3-2, and 3-3; 9 minutes in manufacturing conditions 4-1, 4-2, and 4-3; 95 minutes in manufacturing conditions 5-1, 5-2, and 5-3; and 140 minutes in manufacturing conditions 6-1, 6-2, and 6-3.

Next, the dielectric layer 14 was formed on thus polished upper face. Its forming conditions are shown in the items of "Dielectric formation" in Table 1. Employed as the material for the dielectric layer 14 was BST, i.e., barium strontium titanate (BaSr)TiO$_3$. Chemical solution deposition was used as the method of forming the dielectric layer 14. A solution (sol) of BST was applied by spin coating onto the polished upper face of the metal foil 12 followed by firing, so as to form the dielectric layer 14. The manufacturing conditions were further classified into three species according to the thickness of the dielectric layer 14. Namely, the thickness of the dielectric layer 14 was 100 nm in the manufacturing conditions 1-1, 2-1, 3-1, 4-1, 5-1, and 6-1; 200 nm in the manufacturing conditions 1-2, 2-2, 3-2, 4-2, 5-2, and 6-2; and 700 nm in the manufacturing conditions 1-3, 2-3, 3-3, 4-3, 5-3, and 6-3.

After forming the dielectric layer 14, the upper metal layer 16 was formed by sputtering on the upper face of the dielectric layer 14. The material and size of the upper metal layer 16 are shown in the items of "Dielectric formation" in Table 1. Namely, in all the manufacturing conditions, a Cu layer as the upper metal layer 16 was formed in a size of 4.0 mm×4.0 mm with a thickness of 200 nm.

The inventors made 50 dielectric devices 10 simultaneously under each manufacturing condition, and carried out this operation twice for each manufacturing condition. Determined for each of thus obtained dielectric devices 10 were (1) the arithmetic mean roughness Ra$_1$ of the interface 18 between the metal foil 12 and dielectric layer 14, (2) the arithmetic mean roughness Ra$_2$ of the interface 20 between the dielectric layer 14 and upper metal layer 16, (3) the average value Ram of Ra$_1$ and Ra$_2$, (4) the ratio T/Ram of the thickness T of the dielectric layer 14 to Ram, and (5) the leakage current density between the metal foil 12 and upper metal layer 16. The method of determining Ra$_1$ and Ra$_2$ is as mentioned above with reference to FIGS. 3 and 4. The leakage current density was determined by measuring the leakage current between the metal foil 12 and upper metal layer 16 while applying a DC voltage of 1 V therebetween at room temperature, and dividing this leakage current by the area of the upper metal layer 16.

The following Table 2 shows the results of this experiment.

TABLE 2

| | T(nm) | $Ra_1$ (nm) | $Ra_2$ (nm) | Ram (nm) | T(nm)/ Ram(nm) | RATIO (%) OF LEAKAGE CURRENT DENSITY $\leq 10^{-6}$ A/cm$^2$ | AVERAGE LEAKAGE CURRENT DENSITY (A/cm$^2$) | MANUFACTURING CONDITION |
|---|---|---|---|---|---|---|---|---|
| EXPERIMENTAL EXAMPLE 1 | 100 | 123 | 210 | 166.5 | 0.60 | 0 | $1.30 \times 10^{-3}$ | 1-1 |
| EXPERIMENTAL EXAMPLE 2 | 100 | 115 | 200 | 157.5 | 0.63 | 0 | $1.10 \times 10^{-3}$ | 2-1 |
| EXPERIMENTAL EXAMPLE 3 | 100 | 52 | 98 | 75.0 | 1.33 | 6 | $3.10 \times 10^{-4}$ | 3-1 |
| EXPERIMENTAL EXAMPLE 4 | 100 | 33 | 73 | 53.0 | 1.89 | 20 | $1.00 \times 10^{-5}$ | 4-1 |
| EXPERIMENTAL EXAMPLE 5 | 100 | 4 | 9 | 6.5 | 15.4 | 98 | $5.10 \times 10^{-7}$ | 5-1 |
| EXPERIMENTAL EXAMPLE 6 | 100 | 2 | 4 | 3.0 | 33.3 | 100 | $1.00 \times 10^{-7}$ | 6-1 |
| EXPERIMENTAL EXAMPLE 7 | 200 | 120 | 210 | 165 | 1.21 | 0 | $2.00 \times 10^{-2}$ | 1-2 |
| EXPERIMENTAL EXAMPLE 8 | 200 | 115 | 196 | 156 | 1.29 | 0 | $1.00 \times 10^{-2}$ | 2-2 |
| EXPERIMENTAL EXAMPLE 9 | 200 | 50 | 120 | 85 | 2.35 | 12 | $5.30 \times 10^{-3}$ | 3-2 |
| EXPERIMENTAL EXAMPLE 10 | 200 | 33 | 54 | 44 | 4.60 | 44 | $4.70 \times 10^{-5}$ | 4-2 |
| EXPERIMENTAL EXAMPLE 11 | 200 | 4 | 10 | 7 | 28.6 | 100 | $3.80 \times 10^{-7}$ | 5-2 |
| EXPERIMENTAL EXAMPLE 12 | 200 | 2 | 4 | 3 | 66.7 | 100 | $8.40 \times 10^{-8}$ | 6-2 |
| EXPERIMENTAL EXAMPLE 13 | 700 | 128 | 298 | 213 | 3.29 | 16 | $3.90 \times 10^{-5}$ | 1-3 |
| EXPERIMENTAL EXAMPLE 14 | 700 | 115 | 269 | 192 | 3.65 | 42 | $5.30 \times 10^{-6}$ | 2-3 |
| EXPERIMENTAL EXAMPLE 15 | 700 | 49 | 67 | 58 | 12.1 | 82 | $3.50 \times 10^{-8}$ | 3-3 |
| EXPERIMENTAL EXAMPLE 16 | 700 | 29 | 49 | 39 | 17.9 | 96 | $3.30 \times 10^{-8}$ | 4-3 |
| EXPERIMENTAL EXAMPLE 17 | 700 | 4 | 10 | 7 | 100 | 100 | $1.80 \times 10^{-8}$ | 5-3 |
| EXPERIMENTAL EXAMPLE 18 | 700 | 2 | 6 | 4 | 175 | 100 | $1.50 \times 10^{-8}$ | 6-3 |

This table refers the groups having simultaneously manufactured 50 dielectric devices each under the respective manufacturing conditions to experimental examples 1, 2, and so forth. In each experimental example listed in Table 2, $Ra_1$, $Ra_2$, Ram, and T/Ram are average values of $Ra_1$, $Ra_2$, Ram and T/Ram measured in 50 dielectric devices included therein. Table 2 also lists the average leakage current density of 50 dielectric devices in each experimental example, and the ratio of devices having a low leakage current density of $10^{-6}$ A/cm$^2$ or less in the 50 dielectric devices.

Figure 5:
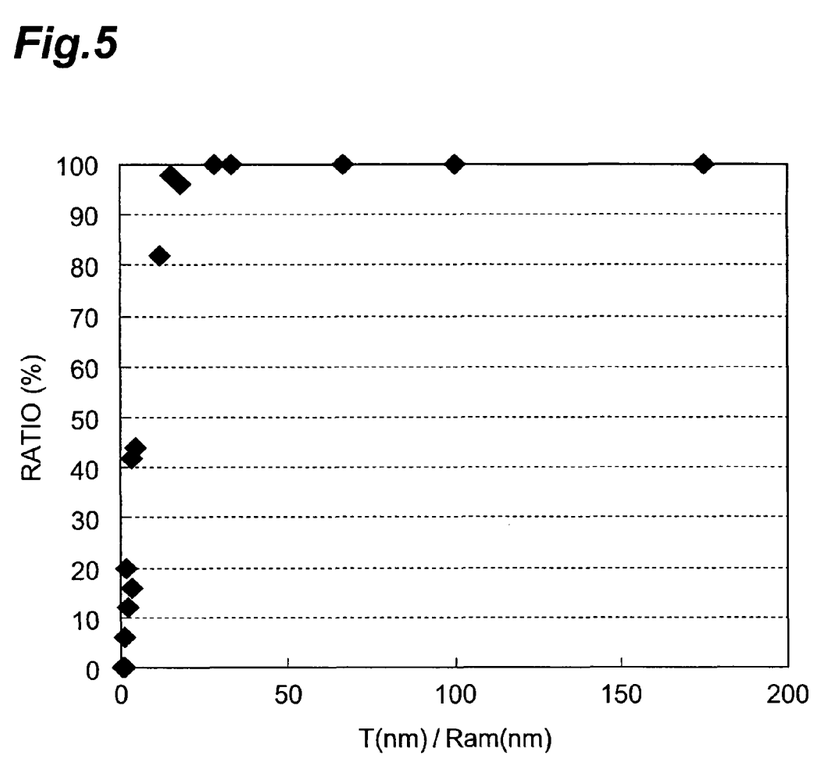
FIG. 5 is a graph showing experimental results.

FIG. 5 is a graph showing experimental results extracted from those listed in Table 2. The horizontal axis indicates the ratio T/Ram of the thickness T of the dielectric layer 14 to the average value Ram of interface roughness, while the vertical axis represents the ratio of dielectric devices 10 exhibiting a leakage current density of $10^{-6}$ A/cm$^2$ or less.

Figure 6:
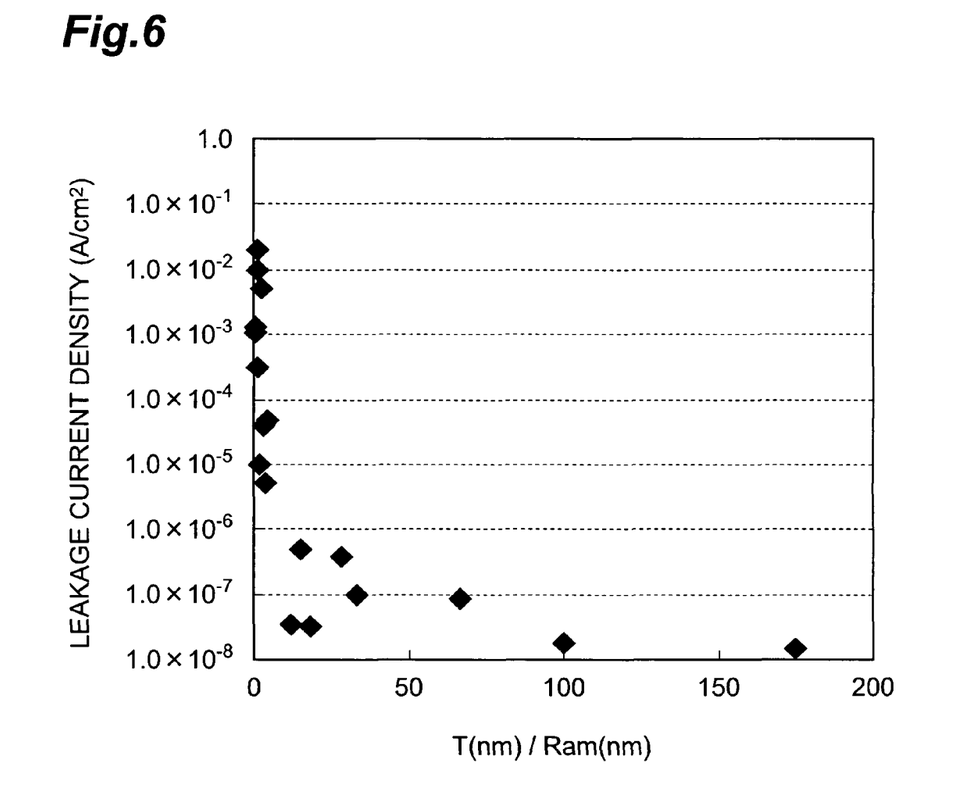
FIG. 6 is a graph showing experimental results.

FIG. 6 is a graph showing experimental results extracted from those listed in Table 2. The horizontal axis indicates the ratio T/Ram of the thickness T of the dielectric layer 14 to the average value Ram of interface roughness, while the vertical axis represents the average leakage current density.

As shown in Table 2 and FIGS. 5 and 6, none of the 50 dielectric devices 10 exhibited a leakage current density of $10^{-6}$ A/cm$^2$ or less in each of the experimental examples in which T/Ram was 1.29 or less. The average leakage current density in these dielectric devices was $10^{-2}$ to $10^{-3}$ A/cm$^2$. In experimental example 3 in which T/Ram was 1.33, by contrast, dielectric devices having a leakage current density of $10^{-6}$ A/cm$^2$ or less were obtained by a ratio of 6%. Though the average leakage current density was a relatively high value of $3.10 \times 10^{-4}$ A/cm$^2$, the ratio of 6% seems to imply that, even when the dielectric layer 14 is thin, the leakage current density of the dielectric device 10 can sufficiently be suppressed if T/Ram is 1.3 or greater.

In experimental example 13 in which T/Ram was 3.29, the ratio of dielectric devices 10 exhibiting a leakage current density of $10^{-6}$ A/cm$^2$ or less was 16%, while the average leakage current density was $3.90 \times 10^{-5}$ A/cm$^2$. In experimental example 14 in which T/Ram was 3.65, by contrast, the ratio of dielectric devices 10 exhibiting a leakage current density of $10^{-6}$ A/cm$^2$ or less drastically increased to 42%, while the average leakage current greatly decreased to $5.30 \times 10^{-6}$ A/cm$^2$. Therefore, the leakage current density of the dielectric device 10 is assumed to decrease effectively when T/Ram is 3.6 or greater.

In experimental example 10 in which T/Ram was 4.60, the ratio of dielectric devices 10 exhibiting a leakage current density of $10^{-6}$ A/cm$^2$ or less was 44%, while the average leakage current density was $4.70 \times 10^{-5}$ A/cm$^2$. In experimental example 15 in which T/Ram was 12.1, by contrast, the ratio of dielectric devices 10 exhibiting a leakage current density of $10^{-6}$ A/cm$^2$ or less reached 82%, while the average leakage current density remarkably decreased to $3.50 \times 10^{-8}$ A/cm$^2$. Therefore, the leakage current density of the dielectric device 10 is assumed to decrease very effectively when T/Ram is 12 or greater.

In experimental example 5 in which T/Ram was 15.4, the average leakage current density was $5.10 \times 10^{-7}$ A/cm$^2$, which was greater than that of experimental example 15 in which T/Ram was 12.1. However, the average leakage current density was 1/10 of that of experimental example 14 in which T/Ram was 3.65 or experimental example 10 in which T/Ram was 4.60, and thus was still very small. Also, in example 5, the ratio of dielectric devices 10 exhibiting a leakage current density of $10^{-6}$ A/cm$^2$ or less was 98%, and thus was very high.

In each of the experimental examples in which T/Ram was 28.6 or greater, the ratio of dielectric devices 10 exhibiting a leakage current density of $10^{-6}$ A/cm$^2$ or less was 100%, while the average leakage current density in each experimental example was $10^{-7}$ to $10^{-8}$ A/cm$^2$. Therefore, a very low leakage current density is assumed to be obtained more reliably when T/Ram is 28 or greater.

The above-mentioned experiment exhibits a tendency that the leakage current can be suppressed more as T/Ram is greater. When T is made too large or Ram is made too small in order to increase T/Ram, however, adverse effects may occur.

When the thickness T of the dielectric layer 14 is too large, for example, cracks are more likely to occur in the dielectric layer 14. These cracks increase the leakage current. From the viewpoint of preventing cracks, T$\leq$1000 nm will be desirable. When the average value Ram of interface roughness is too small, the dielectric layer 14 is more likely to peel off from the metal foil 12 or the upper metal layer 16 is more likely to peel off from the dielectric layer 14. From the viewpoint of preventing peeling, Ram≧0.5 nm will be desirable. Comprehensively, T/Ram≦2000 will be desirable.

In the foregoing, the present invention is explained in detail with reference to its embodiment. However, the present invention is not limited to the above-mentioned embodiment. The present invention can be modified in various ways within the scope not deviating from the gist thereof.

Though the above-mentioned dielectric device 10 has a structure in which a dielectric layer is held between a pair of metal layers, the leakage current reducing effect by the numerical range of T/Ram mentioned above seems to be commonly obtainable in dielectric devices having a structure in which multiple electrodes are in contact with a dielectric layer. For example, setting T/Ram within the above-mentioned numerical range can also suppress the leakage current of the dielectric device when multiple metal layers are formed on one main face of a dielectric layer. Though the respective arithmetic mean roughnesses of the interfaces between the dielectric layer and the metal layers contribute to the magnitude of leakage current, Ram is the average value of the respective arithmetic mean roughnesses of the interfaces, whereby the above-mentioned numerical range of T/Ram can be employed commonly in dielectric devices having a structure in which multiple electrodes are in contact with a dielectric layer.

Though the dielectric layer 14 is constituted by BST in the above-mentioned experimental examples, the dielectric layer in the dielectric device in accordance with the present invention may be constructed by other materials as well. For example, the dielectric layer may be constituted by an oxide containing at least one element of Ba, Sr, Ca, Pb, Ti, Zr, and Hf. The dielectric layer may also be constituted by an oxide having a perovskite structure. The oxide having a perovskite structure has a composition represented by a general formula of $ABO_3$, examples of which include not only BST, but also BT, i.e., barium titanate $BaTiO_3$, strontium titanate $SrTiO_3$, $(BaSr)(TiZr)O_3$, and $BaTiZrO_3$.

As explained in the foregoing, the present invention can provide a dielectric device which can sufficiently suppress the leakage current even when the dielectric layer is thin.

What is claimed is:

1. A dielectric device comprising a dielectric layer and first to nth metal layers (where n is an integer of 2 or greater) in contact with the dielectric layer, wherein:
   at least one of the first to nth metal layers contains a base metal;
   interfaces between the first to nth metal layers and the dielectric layer have respective arithmetic mean roughnesses of $Ra_1$ to $Ra_n$ (nm);
   an average value Ram (nm) of the arithmetic mean roughnesses of $Ra_1$ to $Ra_n$ (nm) and a thickness T (nm) of the dielectric layer satisfy T/Ram≧1.3, where Ram is equal to $(Ra_1 + Ra_2 + \ldots + Ra_n)/n$;
   the Ram (nm) is 53 nm or more;
   the dielectric layer is formed from barium strontium titanate;
   the thickness T (nm) of the dielectric layer is <200 nm;
   one of the first to nth metal layers is a metal foil supporting the dielectric layer;
   the metal foil has an upper main face polished by chemical mechanical polishing (CMP); and
   the dielectric device has a leak current density (A/cm$^2$) of equal to or less than $3.10 \times 10^{-4}$.

2. The dielectric device according to claim 1, wherein the dielectric layer is constituted by an oxide containing at least one element of Ba, Sr, Ca, Pb, Ti, Zr, and Hf.

3. The dielectric device according to claim 1, wherein the dielectric layer is constituted by an oxide having a perovskite structure.

4. The dielectric device according to claim 1, wherein n=2.

5. A dielectric device comprising a dielectric layer and first to nth metal layers (where n is an integer of 2 or greater) in contact with the dielectric layer, wherein:
   at least one of the first to nth metal layers contains a base metal;
   interfaces between the first to nth metal layers and the dielectric layer have respective arithmetic mean roughnesses of $Ra_1$ to $Ra_n$ (nm);
   an average value Ram (nm) of the arithmetic mean roughnesses of $Ra_1$ to $Ra_n$ (nm) and a thickness T (nm) of the dielectric layer satisfy T/Ram≧3.6, where Ram is equal to $(Ra_1 + Ra_2 + \ldots + Ra_n)/n$;
   the Ram (nm) is 53 nm or more;
   the dielectric layer is formed from barium strontium titanate;
   the thickness T (nm) of the dielectric layer is <200 nm;
   one of the first to nth metal layers is a metal foil supporting the dielectric layer;
   the metal foil has an upper main face polished by chemical mechanical polishing (CMP); and
   the dielectric device has a leak current density (A/cm$^2$) of equal to or less than $3.10 \times 10^{-4}$.

6. The dielectric device according to claim 5, wherein the dielectric layer is constituted by an oxide containing at least one element of Ba, Sr, Ca, Pb, Ti, Zr, and Hf.

7. The dielectric device according to claim 5, wherein the dielectric layer is constituted by an oxide having a perovskite structure.

8. The dielectric device according to claim 5, wherein n=2.

* * * * *